Aug. 9, 1927.
C. L. HAYWOOD
1,638,120
VENTILATED WALL RECEPTACLE FOR FOOD
Filed March 2, 1925
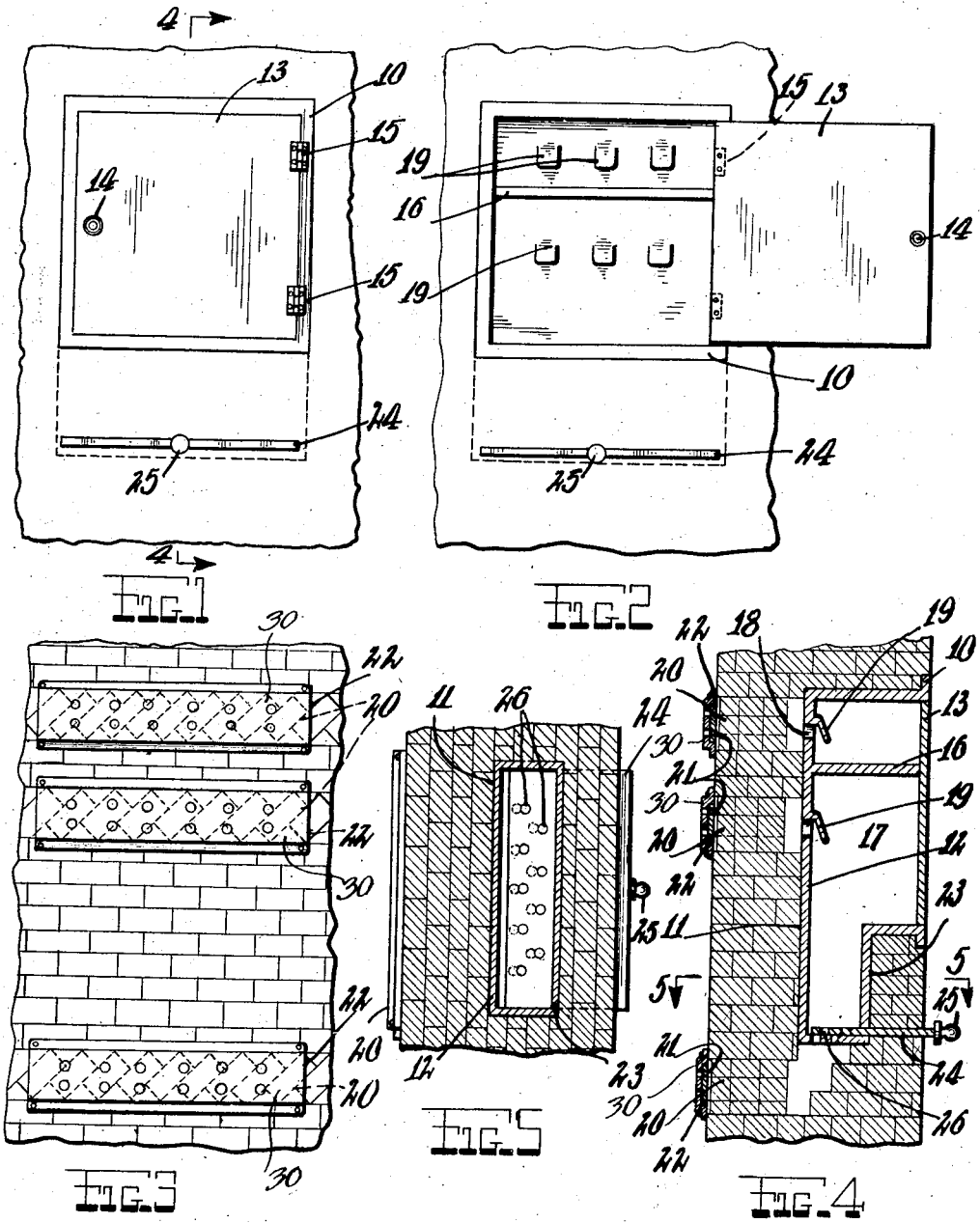
INVENTOR.
Clara L. Haywood
BY
ATTORNEYS.

Patented Aug. 9, 1927.

1,638,120

UNITED STATES PATENT OFFICE.

CLARA L. HAYWOOD, OF BROOKLYN, NEW YORK.

VENTILATED WALL RECEPTACLE FOR FOOD.

Application filed March 2, 1925. Serial No. 12,618.

This invention relates to improvements in air ventilated storage chambers built into the wall of a house, and it is the principal object of the invention to provide for positive and effective ventilation at times and at other times protecting the contents thereof against dust, etc.

Another object of the invention is the provision of a ventilated wall-embedded cabinet for the storage of food or the like having a plurality of storage chambers individually adapted to be closed at the front interrupting the circulation of air within the cabinet in the particular chamber.

A further object of the invention is the provision of a storage receptacle built into the wall of a house, and provided with a lower removable plate drawer for cleaning and ventilating purposes.

A still further object of the invention is the provision of a ventilation food storage chamber built into the wall of a building having its rear wall separated from the house walls and equipped with a plurality of air baffle plates in order to secure at times a proper air circulation to prevent the spoiling of articles of food or the like stored within the chamber.

These and other purposes and advantages of my invention will become more fully apparent as the description thereof proceeds, and will then be specifically pointed out in the appended claim.

In the accompanying drawing, forming a material part of this disclosure:

Fig. 1 is a front view of a storage chamber built into the wall of a house and constructed according to the present invention, closed.

Fig. 2 is a view similar to Figure 1 with the door of the chamber open.

Fig. 3 is a rear view thereof.

Fig. 4 is vertical section through the storage receptacle on line 4—4 of Figure 1.

Fig. 5 is a top plan view of a removable drawer used in combination with my improved goods storage chamber.

As shown in the drawing, the improved storage receptacle comprises a metal box 10 that is vertically elongated and is sunk into a recess or niche 11 of the wall of a house, so that an air space is formed between the rear wall 12 of the chamber and the house wall, as clearly indicated in Figure 4. The front of the chamber is adapted to be closed by a door 13 equiped with a knob or handle 14, and swinging about the hinges 15. The interior of the chamber is divided by shelves 16 or the like into plurality of storage chambers 17, the rear walls of which are perforated by a plurality of openings 18 which are protected on the inside of the chambers by air baffle plates 19. The space between the rear wall of the storage chamber and the wall of the house is filled by a trellis work of bricks 20 or the like, particularly in the upper part thereof, and air is introduced from the outside by means of suitable openings 21 in the house wall cover plate 30 protected by sliding plates 22 having similar openings allowing an exposure of the openings 21 to any desired degree or a perfect closure of the same by any suitable means, not shown, to protect the device against inclement weather or dust, and providing for proper ventilation.

The lower part of the box 10 is somewhat restricted in its area, as at 23, and a slide plate 24 having a depressed bottom part to form a shallow drawer equipped with a frontal operating knob 25 is adapted to slide into and out of the box for allowing a cleaning etc. This slide plate is provided at a part of its face with a plurality of ventilating openings 26 co-actable with similar openings in the bottom of box 10.

The operation of the device will be entirely clear from the above description, and it will be evident that a proper ventilation of the box or chamber is ensured at times, while at other times the same is protected against the inclemencies of the weather, etc., for instance, if the entire box is to be ventilated all the vent openings are opened, and if the entire box is to be dust-proof, as may be desirable for a short period of time, all the vent openings are closed, while one portion of the box may be dust-proof by closing the vent openings to that portion, and simultaneously another portion of the box may be ventilated by opening the vent openings to that portion.

It will be clear that changes may be made in the general arrangement and in the construction of the minor details of my device without departure from the scope and spirit thereof, as specified in the appended claim.

Having thus described my invention, what I claim as new and desire to protect by Letters Patent of the United States is as follows:

In a ventilated wall receptacle for food, a box interiorly divided by a shelf into upper and lower storage chambers, the lower portion of the said box being somewhat restricted in area said box having the rear wall of each chamber, and the bottom wall of the bottom chamber perforated by a plurality of vent openings, obliquely disposed bricks separately in close adjacence to each of the plurality of vent openings in each of said chambers, horizontally disposed bricks separating said groups of obliquely disposed bricks from each other, house wall cover plates having vent openings secured over the rear of each group of obliquely disposed bricks, and slidable plates carried by said cover plates and having similar vent openings to said cover plates, allowing an exposure of the openings to any desired degree, or a perfect closure of the same, whereby each chamber may be separately ventilated, or closed and be dust-proof.

In testimony whereof I have affixed my signature.

CLARA L. HAYWOOD.